H. H. RICHARDS.
Wheels for Vehicles.

No. 150,891. Patented May 12, 1874.

WITNESSES
Mary J. Utley.
George E. Upham.

By

INVENTOR
H. H. Richards
Chipman &c.
ATTORNEYS.

UNITED STATES PATENT OFFICE.

HEZEKIAH H. RICHARDS, OF FOND DU LAC, WISCONSIN.

IMPROVEMENT IN WHEELS FOR VEHICLES.

Specification forming part of Letters Patent No. 150,891, dated May 12, 1874; application filed November 29, 1873.

*To all whom it may concern:*

Be it known that I, HEZEKIAH H. RICHARDS, of Fond du Lac, in the county of Fond du Lac and State of Wisconsin, have invented a new and valuable Improvement in Wheel-Hubs; and I do hereby declare that the following is a full, clear, and exact description of the construction and operation of the same, reference being had to the annexed drawings, making a part of this specification, and to the letters and figures of reference marked thereon.

Figure 1:
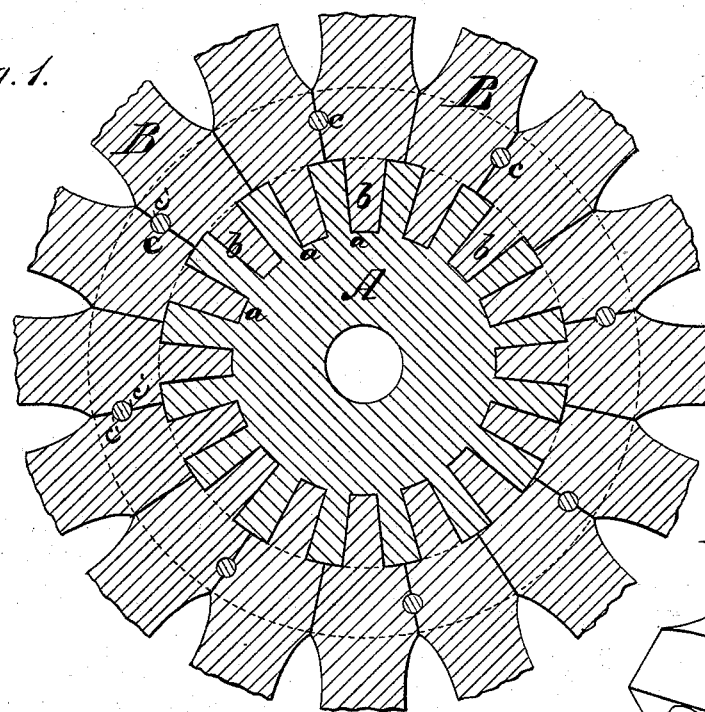
Figure 3:
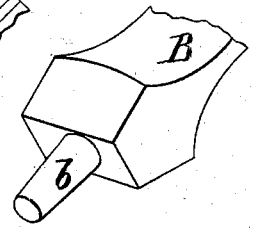
Figure 2:
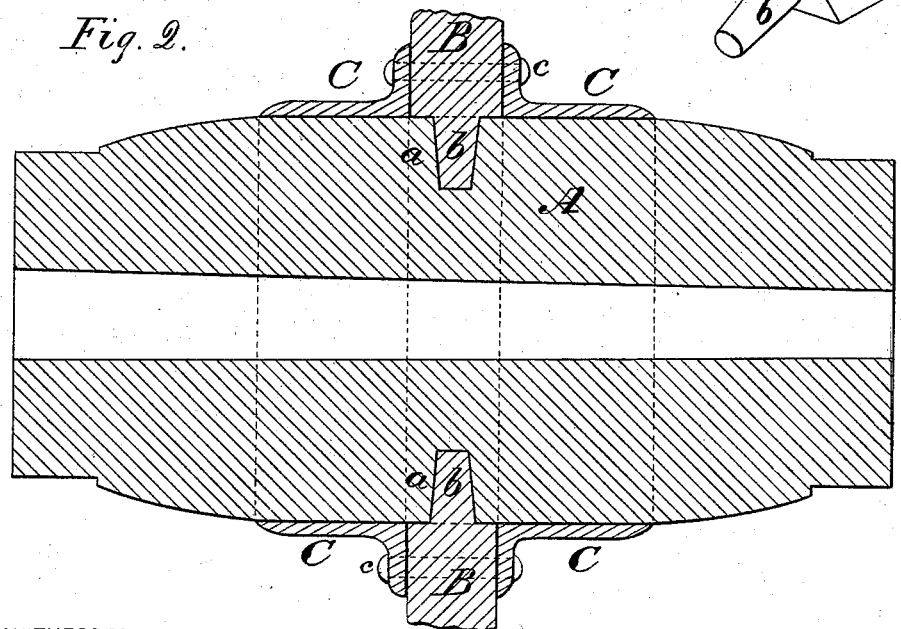

Figure 1 of the drawings is a representation of a transverse section of my wheel-hub. Fig. 2 is a longitudinal section of the same. Fig. 3 is a detail view.

This invention has relation to wheel-hubs wherein the spokes are secured in their places by inserting their ends into the hubs, and using metal clamping-collars on opposite sides of the spokes. My invention consists in bored holes in the hub, in combination with round tapered pins on the spokes, and with metal clamping-collars and rivets or bolts, whereby a much less expensive wheel can be made than one having square mortises in the hubs, and correspondingly-shaped tenons on the spokes, as will be hereinafter explained.

The following is a description of my improvement:

In the annexed drawings, A represents a wooden hub; B, the inserted spokes, and C C the flanged metal clamping-collars.

Instead of cutting square or rectangular mortises into the hub to receive the ends of the spokes, I make round and tapered holes, *a*, which can be quickly done by a boring-tool of the required shape. Into these holes I drive the reduced ends *b* of the spokes, which ends are rounded and tapered, so as to fit tightly into the holes *a*. When the spokes are all driven into their places they are further secured by means of the collars C C and bolts or rivets *c*.

It will be noticed that each spoke has a semicircular groove, *c'*, so that when the spokes are inserted in their proper places in the hub, they will form circular holes by the opposite grooves in the adjacent faces of said spokes to receive the rivets or bolts *c*, as shown in Fig. 1 of the drawings.

I am aware that it is not new to attach spokes to their hubs by forming cylindrical pins on the spokes, and fitting these pins into corresponding holes in the hubs, and therefore I do not claim such a contrivance. The improvement which I have made is to form in the center of the end of each spoke a circular wedge, *b*, which, when it is driven into a hole of corresponding taper, will form a wedge-tight joint and a substantial connection. This feature, in combination with the clamping-collars and rivets, enables me to make a wheel cheaply and at the same time very durable.

What I claim as new, and desire to secure by Letters Patent, is—

The combination of the perforated hub-body A with the tapering and grooved spoke ends B, in contact with each other entirely around said body, the tapering center tenons *b*, entering the perforations of said body, the side caps C, and the bolts *c*, passing through the grooves of the adjacent faces of the spoke ends, and securing the caps together, substantially as specified.

In testimony that I claim the above I have hereunto subscribed my name in the presence of two witnesses.

HEZEKIAH H. RICHARDS.

Witnesses:
 GEO. P. KNOWLES,
 MILTON T. SIMMONS.